May 19, 1931.  J. PRIMROSE  1,805,635
REFLUX TOWER
Filed Nov. 6, 1924  2 Sheets-Sheet 1
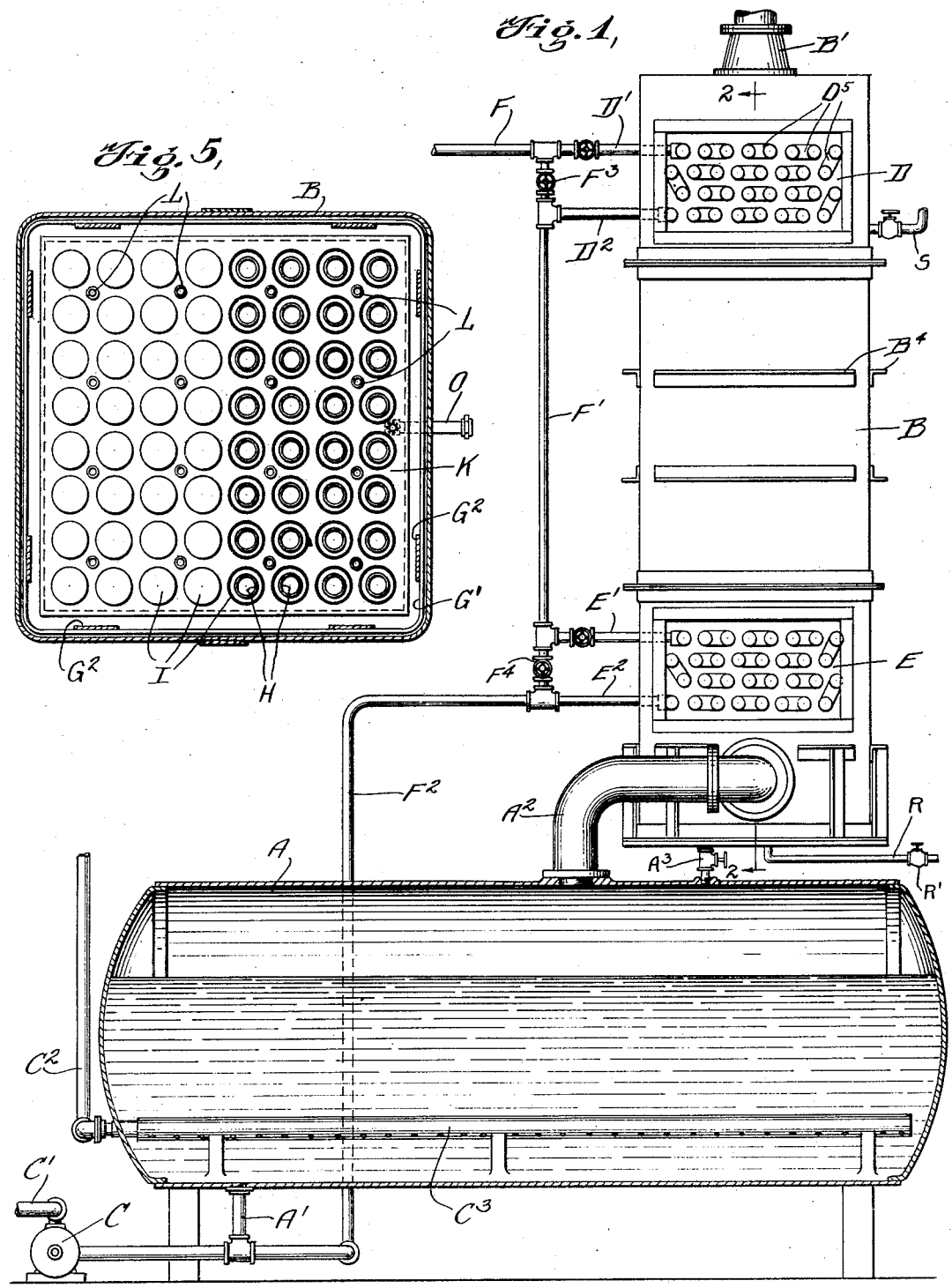

May 19, 1931.  J. PRIMROSE  1,805,635
REFLUX TOWER
Filed Nov. 6, 1924  2 Sheets-Sheet 2
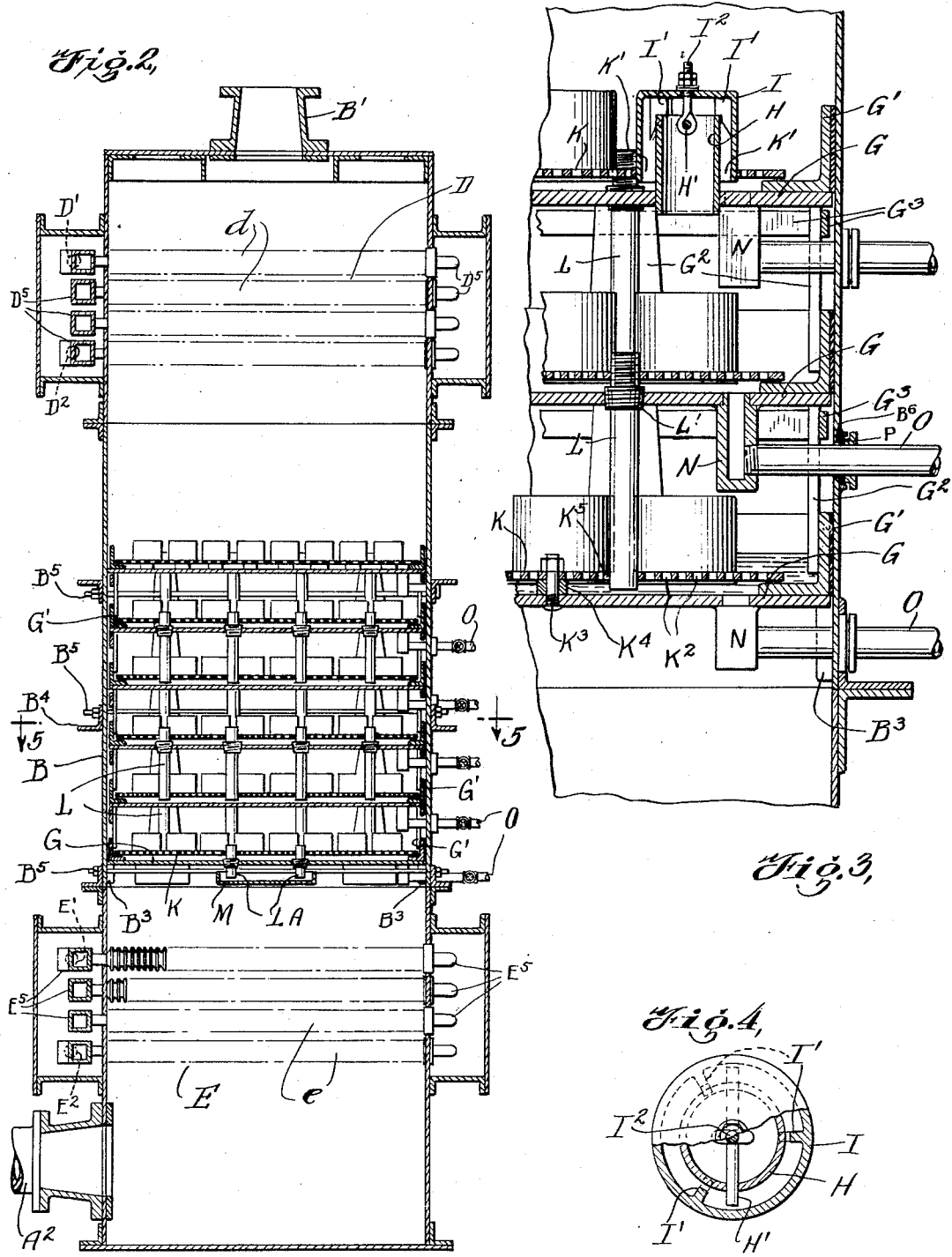

Patented May 19, 1931

1,805,635

UNITED STATES PATENT OFFICE

JOHN PRIMROSE, OF RICHMOND, NEW YORK, ASSIGNOR TO FOSTER WHEELER CORPORATION, OF NEW YORK, N. Y., A CORPORATION OF NEW YORK

REFLUX TOWER

Application filed November 6, 1924. Serial No. 748,115.

The general object of my present invention is to provide improvements in reflux towers adapted for use in refining petroleum and receiving oil vapors and liquid oil entrained in the vapor or otherwise coming into the tower with the vapors from oil heating apparatus, and in which the vapors boiling at and below a temperature usually somewhat lower than the temperature at which the vapors enter the tower, are separated from condensates of higher boiling points formed in the tower, and from oil entering the tower in liquid form.

My improved reflux tower comprises provisions analogous to those employed in a bubbling still to effect intimate contact between and definite graduations in temperature of ascending streams of vapor and descending streams of the condensate and liquid oil, if any, supplied for reflux purposes. My invention consists in improvements in construction and arrangement of the provisions whereby this bubbling still action is obtained.

The various features of novelty which characterize my invention are pointed out with particularity in the claims annexed to and forming a part of this specification; but for a better understanding of the invention, however, its advantages and specific objects obtained with its use, reference should be had to the accompanying drawings and descriptive matter in which I have illustrated and described a preferred embodiment of my invention.

Of the drawings:

Fig. 1 is an elevation in section;

Fig. 2 is a section on the line 2—2 of Fig. 1;

Fig. 3 is an enlarged sectional elevation of a portion of the separating tower shown in Fig. 1;

Fig. 4 is a plan view of a detail of the still; and

Fig. 5 is a section on the line 5—5 of Fig. 2.

The apparatus shown in the drawings comprises a tank A forming a part of an oil heating and vaporizing apparatus, and a separating tower B receiving the vapors from the oil vaporizing apparatus. The tank A is provided with an oil outlet A' at its bottom from which oil is drawn by a pump C, which delivers the oil through the outlet pipe C' to a suitable heater (not shown), from which hot oil and oil vapors are returned through the pipe $C^2$, and injected into the tank A through a perforated pipe $C^3$ located in the tank A below the oil level therein. The vapors rising from the surface of the oil in the tank A pass through the vapor outlet $A^2$ into the lower end of the separating and condensing or reflux tower B.

In the upper end of the tower B, immediately below the vapor outlet B' is located a cooling device D, and in the lower end of the tower immediately above the vapor inlet $B^2$ to the tower is located a second cooling device E.

As shown, the cooling device D comprises a bank of horizontally disposed gilled tubes $d$, similar to the gilled tubes employed in Foster superheaters and economizers. The tubes $d$ are connected at their ends by end connections $D^5$ so that a cooling fluid, supplied to the cooler through the valved inlet D' connected to one end of one of the upper row tubes $d$, passes successively through all of the tubes $d$ in the upper row, and thence successively through all the tubes in the next lower row, and so on until it reaches the cooler outlet $D^2$. The cooler E, as shown, is similar to the cooler D and comprises tubular elements $e$, end connections $E^5$, a valved inlet E' and an outlet $E^2$, which correspond respectively, to the tubular elements $d$, end connections $D^5$, inlet D' and outlet $D^2$ of the cooler D. In the form illustrated, the cooling agent passed through the coolers D and E is the feed or stock oil passing to the oil vaporizing apparatus, F representing the stock oil supply pipe, which is connected to the valved inlet D' of the cooler D. A pipe F' connects the outlet $D^2$ of the cooler D to the inlet valve E' of the cooler E, and $F^2$ represents a pipe line connecting the outlet $E^2$ of the cooler E to the intake of the pump C. $F^3$ represents a valved connection between the pipes F and F' forming a by-pass about the cooler D, whereby more or less of the oil flowing through the pipe F may be passed through the cooler D; and the valved pipe connection F⁴ between the pipes F' and F² forms a similar by-pass about the cooler E. By regulating the various valves more or less of the stock oil may be passed through each of the coolers D and E, and the cooling effect produced in the tower B by each of the coolers D and E may thereby be independently adjusted to meet varying conditions of operation. It will be understood, of course, that the heat abstracted from the tower B by the cooling devices D and E is thus effectively utilized in raising the temperature of the stock oil passing to the oil vaporizing apparatus.

Located in the tower B between the coolers D and E are a set of perforated trays or diaphragms G for causing the ascending vapors to come into intimate contact with the descending vapor condensate. The trays G and their accessories may be of any usual or suitable form employed in so-called "bubbling," in so far as the utilization of the more general principle of the present invention is concerned. Advantageously, however, these trays are of the special construction shown best in Figs. 2 and 3. As there shown, the lowermost tray G is supported on shoulders B³ carried by opposite sides of the casing of the tower B which is shown as rectangular in cross section. The shoulders B³ may advantageously be formed by metal bars welded to the wall of the casing. Each tray G is provided with an uprising rim G' at its margin which is advantageously formed by welding an angle bar to the tray. Each lower tray is provided with uprising projections or posts G² for directly supporting the tray above it and indirectly supporting any trays above the last mentioned tray. Advantageously, the posts G² are in the form of metal bars welded to the tray rims G', and the posts carried by each tray are advantageously tied together at their upper ends by a bar G³, to which the upper ends of the posts are welded. When, as in the preferred construction illustrated, the casing of the tower B is formed of plates welded together, the opposite sides of the casing are advantageously stiffened by external angle bars B⁴ and are tied together by tie-bolts B⁵.

Each tray G is formed with a plurality of distributed apertures, in each of which is welded a short vertically disposed tube H. The tubes H form the conduits through which the vapors pass upward through the trays. Over the upper end of each tube H is mounted an inverted cup or bell member I. As shown, the bell members I are of cast metal and are formed with internal ribs I' which rest on the top of the corresponding tube H and serve to center the bell with respect to the tube and to maintain a gas passage over the top of the tube and between the outer surface of the tube and the inner surface of the bell. Each bell is clamped on the corresponding tube H by an I-bolt I² passing through the top of the bell and secured at its lower end to a pin H' connected to the upper end of the tube. The bottom edge of each bell I passes down to, and advantageously through, and slightly below a perforated plate K, which is supported a short distance above the corresponding tray G and is formed with apertures K' surrounding the corresponding tubes H, each of which, as shown, receives the lower end of the corresponding bell I and in any event is large enough in diameter to permit gas to pass from the annular space between the corresponding tube H and bell I into the space between the plate K and subjacent tray G. In addition, each plate K is formed with a multiplicity of small distributed orifices K² through which the vapors passing into the space between each tray G and the plate K above it may bubble up through the liquid condensate above the tray and in which the plate K is submerged. Each plate K is secured to and spaced away from the subjacent tray G by studbolts K³ and washers K⁴ surrounding the studbolts.

The accumulation of liquid condensate on each tray G is regulated by means of drain pipes L which extend vertically through the tray at suitable distributed points and each of which has its upper end located at the desired over-flow level. The drain pipes L for each tray G, except the lowermost tray, extends downward through an aperture K⁵ in the subjacent perforated plate K into the space between the latter and its supporting tray G. As shown, each drain pipe L is provided with a threaded collar L' screwed into a threaded opening in the tray G to which it pertains, and leakage is avoided by welding the pipe in place. The lowermost tray G is provided with drain pipes LA similar to the drain pipes L, except that their portions beneath the lowermost tray are shorter and dip into the sealing trough or pan M secured to the underside of the lowermost tray with its top edge spaced away from the under side of the tray to permit the condensate to over-flow onto the cooler E. As shown also, there are fewer drain pipes LA associated with the lower tray G than there are drain pipes L associated with each upper tray G. All of the drain pipes LA are arranged adjacent the center of the tower B so as to discharge into the centrally located pan M, whereas the drain pipes L for each upper tray are distributed with tolerable uniformity over the entire horizontal extent of the tray. It will be understood that the drain pipes of adjacent trays are staggered and not in vertical alignment, and that the same is true of the tubes H and bells I. Each tray G is provided with a depending chambered member N forming an outlet pocket through which condensate accumulating on the tray may be removed from the tower for sampling or fractional separation, through a corresponding valved outlet pipe O detachably connected to the member N, and passing through a corresponding opening B⁶ formed in the tank wall, and large enough to permit some latitude in the disposition of the part O. Suitable packing provisions P are made to prevent leakage through the openings B⁶.

Any liquid oil carried into the tower with the vapor through the vapor inlet A², the condensate formed in the tower, and the reflux liquid, if any, supplied to the upper end of the tower through the pipe S, collect in the lower portion of the tower, and may be returned directly to the tank A through the valved connection A³, or may be in whole or in part conveyed away from the tower through an outlet pipe R, provided with a valve R'.

In the operation of the apparatus illustrated and described, vapors entering the tower through the inlet A² may be initially cooled more or less, or not at all, as conditions make desirable, by passing more or less, or none at all, of the feed oil stock through the tubes e of the cooler E. As the vapors pass upward through the trays G they are brought into intimate contact with the downflowing liquid collecting on and draining through the various trays as in an ordinary bubbling still, with a resultant progressive decrease in vapor pressure and temperature from the bottom to the top of the tray bank. As the vapors ascend through the tower, they are enriched by the volatile constituents which they take from the descending liquid and give to the latter less volatile constituents which condense out of the vapors. The vapors rising from the uppermost tray G in the bank pass across the tubes d of the cooler D to the vapor outlet B' of the tower, and in their passage are cooled with a resultant condensation of constituents thereof having relatively high boiling points. All constituents of the condensate thus formed will have approximately the same boiling point, and the average boiling point of this condensate will be a trifle higher than the temperature of the ascending vapors reaching the uppermost tray G. By suitably regulating the amount of oil passing into the cooler D through the valved inlet D', the cooling action of the cooler D may be closely controlled and made as small or large as is most desirable for any particular conditions of operation. The condensate forming on the tubes d of the cooler D and initially collected on the uppermost tray G serves as reflux liquid, the temperature of which, as already explained, can be quite closely regulated, and the boiling point of which closely approximates the boiling point of the highest boiling point constituents of the vapors leaving the tower through the outlet B. In consequence, little or no reflux liquid need be supplied to the tower through the pipe S or otherwise, to eliminate all but a relatively small and insignificant amount of constituents in the vapor discharged through the vapor outlet B' having boiling points above the temperature of the vapors discharged. In consequence, the apparatus as a whole is characterized by the purity of the vapor product discharged, and by the simplicity and thermal efficiency of the means employed to secure this purity.

The tower as a whole, and the bubbling still section thereof in particular, are characterized by the simplicity and effectiveness of the features of construction employed. By opening the upper portion of the tower the trays G' may be removed with comparative ease, when this is necessary for cleaning or other purposes. The trays, bells, drain pipes, etc., are durable and are relatively cheap and inexpensive to construct, and insure a highly effective bubbling still effect. The effectiveness of the bubbling still action is enhanced by the provision of the perforated plates K above the trays G. By the use of small and suitably distributed ports K², the gases entering the space between each tray G and the perforated plate K above it may be caused to spread out horizontally to thus materially augment the gas and liquid contact area as compared with the usual arrangements heretofore employed in which the gas escaping from the bells passes almost directly upward from the lower edges of the bells.

While in accordance with the provisions of the statutes, I have illustrated and described the best embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. In oil and vapor separating apparatus, the combination with a vertical casing having a plurality of bubble trays therein, of a liquid reservoir carried by each tray, and a lateral outlet pipe connected to each of said reservoirs and projecting through the casing and through which a portion of the liquid collecting on the tray may be withdrawn from the casing.

2. In oil and vapor separating apparatus, the combination with a vertical casing having a plurality of trays therein, of a liquid reservoir carried by each tray and extending downward therefrom and open at its upper end to receive liquid accumulating on top of the corresponding tray, a lateral outlet pipe connected to each of said reservoirs, said casing being formed with a plurality of ports, through each of which a corresponding outlet pipe loosely passes, and packing provisions to prevent leakage through said ports.

Signed at New York city, in the county of New York, and State of New York, this 3rd day of November, A. D. 1924.

JOHN PRIMROSE.